United States Patent
Velazquez Alcantar et al.

(10) Patent No.: US 11,584,225 B2
(45) Date of Patent: Feb. 21, 2023

(54) ONE-PEDAL SPEED CONTROL FOR OFF-ROAD DRIVING

(71) Applicant: FORD GLOBAL TECHNOLOGIES, LLC, Dearborn, MI (US)

(72) Inventors: Jose Velazquez Alcantar, Canton, MI (US); Joseph Jay Torres, Dearborn, MI (US); Ming Lang Kuang, Canton, MI (US); Michael Edward Brewer, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 276 days.

(21) Appl. No.: 16/914,710

(22) Filed: Jun. 29, 2020

(65) Prior Publication Data
US 2021/0402877 A1    Dec. 30, 2021

(51) Int. Cl.
| | |
|---|---|
| *B60K 26/00* | (2006.01) |
| *B60K 26/02* | (2006.01) |
| *B60K 1/02* | (2006.01) |
| *B60K 17/34* | (2006.01) |
| *B60W 30/18* | (2012.01) |
| *B60L 58/12* | (2019.01) |

(52) U.S. Cl.
CPC .............. *B60K 26/02* (2013.01); *B60K 1/02* (2013.01); *B60K 17/34* (2013.01); *B60L 58/12* (2019.02); *B60W 30/18181* (2013.01); *B60K 2026/025* (2013.01)

(58) Field of Classification Search
CPC .......... B60K 17/34; B60K 26/02; B60K 1/02; B60L 58/12; B60L 3/12
USPC .......................................................... 180/245
See application file for complete search history.

(56) References Cited

U.S. PATENT DOCUMENTS

| | | | |
|---|---|---|---|
| 9,026,296 B1* | 5/2015 | Johri ..................... | B60W 10/06 701/22 |
| 9,381,911 B2* | 7/2016 | Aldrich, III .... | B60W 30/18063 |
| 10,005,363 B1* | 6/2018 | Correia ................... | B60L 3/12 |
| 2006/0097570 A1* | 5/2006 | Doerr ........................ | B60T 7/22 303/193 |
| 2012/0010041 A1* | 1/2012 | Soliman ................ | B60W 20/20 180/65.265 |
| 2013/0288855 A1* | 10/2013 | Monsere ............. | B60L 15/2063 477/24 |
| 2016/0052510 A1* | 2/2016 | Aldrich, III ............ | F02N 11/04 180/65.265 |
| 2016/0101780 A1* | 4/2016 | Park ...................... | B60W 50/14 701/70 |
| 2017/0327005 A1* | 11/2017 | Meyer ................... | B60W 10/08 |
| 2017/0361851 A1 | 12/2017 | Takeya et al. | |
| 2018/0194341 A1* | 7/2018 | Owen ................... | B60W 10/20 |

(Continued)

*Primary Examiner* — Hau V Phan
(74) *Attorney, Agent, or Firm* — David B Kelley; Brooks Kushman P.C.

(57) ABSTRACT

A vehicle with one-pedal driving mode includes a first axle having a first electric machine configured to power first wheels and a second axle having a second electric machine configured to power second wheels. A controller is programmed to, in response to a request for one-pedal driving mode, map pedal positions of the accelerator pedal to speeds of the first and second wheels such that each of the pedal positions corresponds to a driver-demanded speed of the first and second wheels, and control one or more of the electric machine so that the vehicle is propelled according to the driver-demanded speed.

20 Claims, 7 Drawing Sheets

(56) References Cited

U.S. PATENT DOCUMENTS

2018/0354492 A1* 12/2018 Meyer .................. B60W 10/26
2019/0106103 A1   4/2019 Inoue et al.
2020/0108816 A1* 4/2020 Velazquez Alcantar ....................
                                                    B60K 17/354

* cited by examiner

ONE-PEDAL SPEED CONTROL FOR OFF-ROAD DRIVING

TECHNICAL FIELD

The present disclosure relates to electric vehicles and more specifically to a mode in which the vehicle can be driven using only one pedal.

BACKGROUND

Electrified vehicles, such as fully electric and hybrid electric vehicles, include at least one electric machine for propelling the vehicle. The electric machine is powered by a traction battery that supplies energy to the electric machine, which reduces a state of charge (SOC) of the battery. Many electrified vehicles are capable of regenerative braking to recharge the battery by converting mechanical power into electrical power. Hybrid electric vehicles additionally include an engine.

SUMMARY

According to one embodiment, a vehicle with one-pedal driving mode includes a first axle having a first electric machine configured to power first wheels and a second axle having a second electric machine configured to power second wheels. The vehicle further includes an accelerator pedal and a controller. The controller is programmed to, in response to a request for one-pedal driving mode, map pedal positions of the accelerator pedal to speeds of the first and second wheels such that each of the pedal positions corresponds to a driver-demanded speed of the first and second wheels, and, in response to the driver depressing the accelerator pedal to a first of the pedal positions, (i) set a driver-demanded wheel speed to a value associated with the first pedal position, (ii) set a target wheel speed of the first wheels based on the driver-demanded wheel speed, (iii) set a target electric machine speed for the first electric machine based on the target wheel speed, and (iv) command a positive torque to the first electric machine based an error between the target electric machine speed and a measured speed of the first electric machine so that the first wheels rotate according to the target wheel speed.

According to another embodiment, a method of operating a four-wheel drive electric vehicle in a one-pedal driving mode includes, in response to the vehicle being in the one-pedal driving mode and an accelerator pedal being depressed to a first pedal position, commanding a positive torque to an electric machine based on an error between target and measured speeds of the electric machine so that wheels driven by the electric machine rotate according to a target wheel speed based on the first pedal position, and, in response to the vehicle being in the one-pedal driving mode and an accelerator pedal being fully released to a second pedal position, commanding a negative torque to the electric machine based on an error between another target and measured speeds of the electric machine so that the wheels driven by the electric machine rotate according to another target wheel speed based on the second pedal position.

According to yet another embodiment, a vehicle with one-pedal driving mode includes a first axle having a first electric machine configured to power first wheels and a second axle having a second electric machine configured to power second wheels. The vehicle further includes an accelerator pedal and a controller. The controller is programmed to, in response to a request for one-pedal driving mode: receive minimum and maximum speeds for the first and second wheels during the one-pedal driving mode; map pedal positions of the accelerator pedal to speeds of the first and second wheels such that each of the pedal positions corresponds to a driver-demanded speed of the first and second wheels, wherein the driver-demanded speed is the maximum wheel speed when the accelerator pedal is fully depressed, and the driver-demanded speed is the minimum wheel speed when the accelerator pedal is fully released; and, in response to the driver depressing the accelerator pedal to a first of the pedal positions, (i) set the driver-demanded wheel speed to a value associated with the first pedal position, (ii) set a target wheel speed of the first wheels based on the driver-demanded wheel speed, (iii) set a target electric machine speed for the first electric machine based on the target wheel speed, and (iv) perform closed-loop feedback control of the first electric machine in which the first electric machine tracks the target electric machine speed so that the first wheels are rotated substantially at the target wheel speed.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
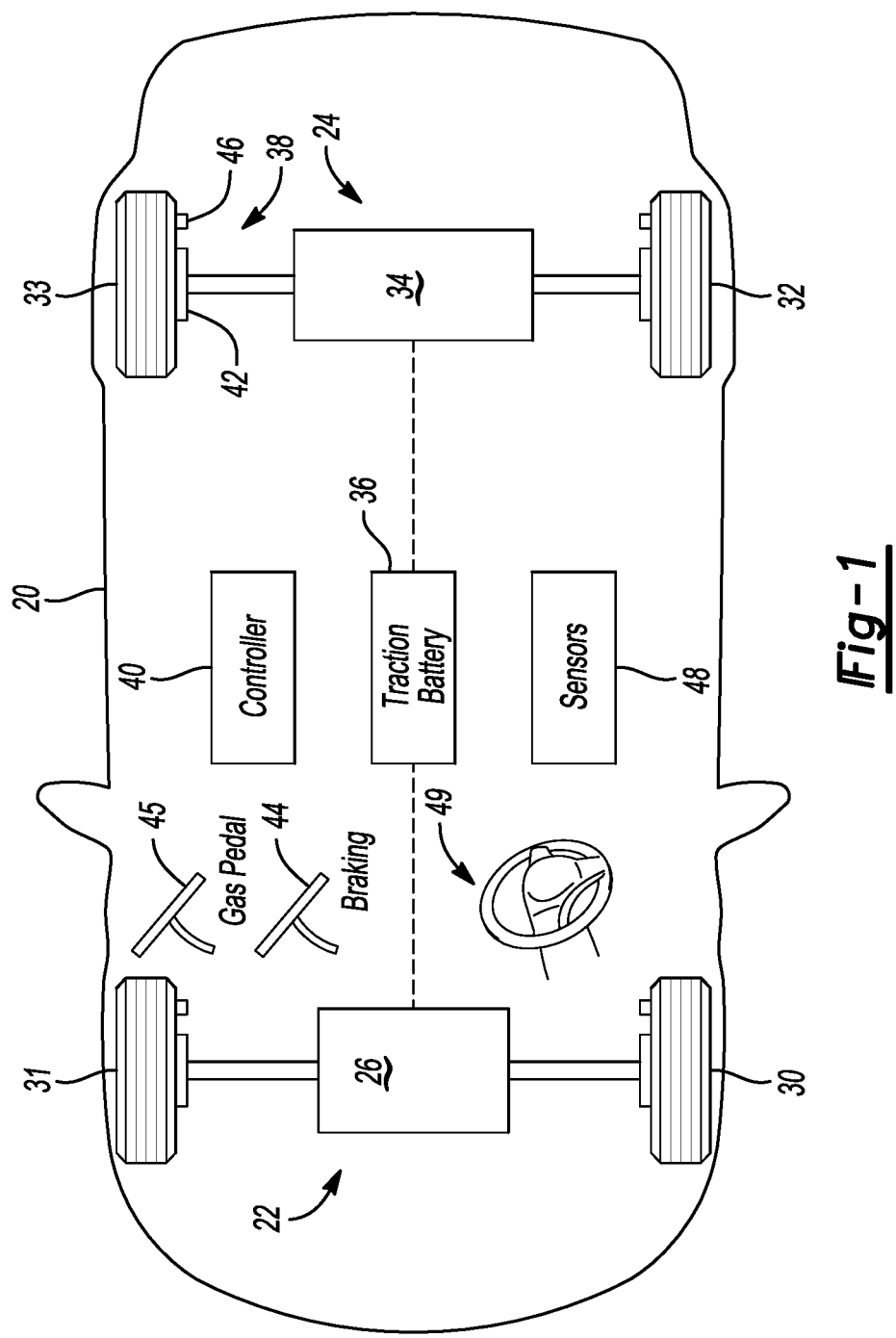
FIG. 1 is a schematic diagram of an electric machine vehicle.

Referring to FIG. 1, an electrified vehicle 20 is illustrated as a fully electric vehicle but, in other embodiments, the electrified vehicle 20 may be a hybrid-electric vehicle that includes an internal-combustion engine. The vehicle 20 has electric all-wheel drive (AWD). The vehicle 20 may include a primary drive axle 24 and a secondary drive axle 22. In the illustrated embodiment, the primary drive axle 24 is the rear axle and the secondary drive axle 22 is the front axle. In other embodiments, the front axle may be the primary drive and the rear axle may be the secondary drive. The primary and secondary axles may include their own powerplant, e.g., an engine and/or an electric machine, and are capable of operating independently of each other or in tandem to accelerate (propel) or brake the vehicle 20.

The secondary drive axle 22 may include at least one powerplant, e.g., electric machine 28, operable to power the secondary wheels 30 and 31. A gearbox (not shown) may be included to change a speed ratio between the wheels 30, 31 and the powerplant(s). The primary drive axle 24 may include at least one powerplant, e.g., an electric machine 34, that is operably coupled to the primary wheels 32 and 33. A gearbox (not shown) may be included change a speed ratio between the powerplant(s) 34 and the wheels 32, 33.

The electric machines 28, 34 are capable of acting as motors to propel the vehicle 20 and are capable of acting as generators to brake the vehicle via regenerative braking. The electric machines 28, 34 may be permanent magnet synchronous alternating current (AC) electric motors or other suitable type.

The electric machines 28, 34 are powered by one or more traction batteries, such as traction battery 36. The traction battery 36 stores energy that can be used by the electric machines 28, 34. The traction battery 36 typically provides a high-voltage direct current (DC) output from one or more battery cell arrays, sometimes referred to as battery cell stacks, within the traction battery 36. The battery cell arrays include one or more battery cells. The battery cells, such as a prismatic, pouch, cylindrical, or any other type of cell, convert stored chemical energy to electrical energy. The cells may include a housing, a positive electrode (cathode), and a negative electrode (anode). An electrolyte allows ions to move between the anode and cathode during discharge, and then return during recharge. Terminals may allow current to flow out of the cell for use by the vehicle 20. Different battery pack configurations may be available to address individual vehicle variables including packaging constraints and power requirements. The battery cells may be thermally regulated with a thermal management system.

The traction battery 36 may be electrically connected to one or more power-electronics modules through one or more contactors. The module may be electrically connected to the electric machines 28, 34 and may provide the ability to bi-directionally transfer electrical energy between the traction battery 36 and the electric machines 28, 34. For example, a typical traction battery 36 may provide a DC voltage while the electric machines 28, 34 may require a three-phase AC voltage to function. The power-electronics module may convert the DC voltage to a three-phase AC voltage as required by the electric machines. In a regenerative mode, the power-electronics module may convert the three-phase AC voltage from the electric machines 28, 34 acting as generators to the DC voltage required by the traction battery 36.

The vehicle 20 includes a controller 40 in electric communication with a plurality of vehicle systems and is configured to coordinate functionality of the vehicle. The controller 40 may be a vehicle-based computing system that includes one or more controllers that communicate via a serial bus (e.g., controller area network (CAN)) or via dedicated electrical conduits. The controller 40 generally includes any number of microprocessors, ASICs, ICs, memory (e.g., FLASH, ROM, RAM, EPROM and/or EEPROM) and software code to co-act with one another to perform a series of operations. The controller 40 also includes predetermined data, or "lookup tables" that are based on calculations and test data, and are stored within the memory. The controller 40 may communicate with other vehicle systems and controllers over one or more wired or wireless vehicle connections using common bus protocols (e.g., CAN and LIN). Used herein, any reference to "a controller" refers to one or more controllers. The controller 40 may include battery energy control module (BECM) that operates at least the traction battery, a powertrain control module (PCM) that operates at least the electric machines, and an ABS control module that controls the anti-lock braking system (ABS) 38.

The ABS 38 may be a hydraulic system, an electric system. or a combination of electronic and a hydraulic. The ABS 38 may include a brake module and a plurality of friction brakes 42 located at each of the wheels. Modern vehicles typically have disc brakes; however, other types of friction brakes are available, such as drum brakes. Each of the brakes 42 are in fluid communication with the brake module via a brake line configured to deliver fluid pressure from the module to a caliper of the brakes 42. The module may include a plurality of valves configured to provide independent fluid pressure to each of the brakes 42. The brake module may be controlled by operation of a brake pedal 44 and/or by the vehicle controller 40 without input from the driver. The ABS system 38 also includes associated wheel-speed sensors 46 each located at one of the wheels. Each sensor 46 is configured to output a wheel-speed signal to the controller 40 indicative of a measured wheel speed.

The vehicle 20 is configured to slow down using regenerative braking, friction braking, or a combination thereof. The controller 40 includes programming for aggregating a demanded braking torque between regenerative braking, i.e., the electric machines, and the friction brakes 42. The demanded braking torque may be based on driver input, e.g., a position of the brake pedal 44, or by the controller 40. The aggregator of the controller 40 may be programmed to slow the vehicle using regenerative braking whenever possible and apply the friction brakes 42 when necessary.

The vehicle 20 includes an accelerator pedal 45. The accelerator pedal 45 includes a range of travel from a released position to a fully depressed position and indeterminate positions therebetween. The accelerator pedal 45 includes an associated sensor (not shown) that senses the position of the pedal 45. The sensor is configured to output a pedal-position signal to the controller 40 that is indicative of a sensed position of the pedal 45. The accelerator pedal 45 is used by the driver to command a desired speed of the vehicle. Under normal conditions, the accelerator pedal 45 is used by the driver to set a driver-demanded torque. The controller 40 may be programmed to receive the pedal-position signal and determine the driver-demanded torque based on pedal position and other factors. During a one-pedal driving mode, the accelerator pedal is used to set a target wheel/vehicle speed as will be described in detail below.

The vehicle 20 may include one or more sensors 48 configured to determine accelerations of the vehicle. For example, the sensors 48 may include a yaw-rate sensor, a lateral-acceleration sensor, and a longitudinal-acceleration sensor. Used herein, "acceleration" refers to both positive acceleration (propulsion) and negative acceleration (braking). The yaw-rate sensor generates a yaw-rate signal corresponding to the yaw rate of the vehicle. Using the yaw rate sensor, the yaw acceleration may also be determined. The lateral-acceleration sensor outputs a lateral-acceleration signal corresponding to the lateral acceleration of the vehicle. The longitudinal-acceleration sensor generates a longitudinal-acceleration signal corresponding to the longitudinal acceleration of the vehicle. The various sensors are in communication with the controller 40. In some embodiments, the yaw rate, lateral acceleration, longitudinal acceleration, and other measurements may be measured by a single sensor.

The vehicle 20 may also include a steering system 49 that turns the front wheels 30, 31. The steering system 49 may include a steering wheel connected to a steering shaft that actuates a steering box, such as a rack-and-pinion assembly. The steering box is operably coupled to the front wheels 30, 32 and turns the wheels according to inputs from the steering wheel. The steering system 49 may include one or more sensors configured to output a signal indicative of steering angle to the controller 40. The steering sensor may measure rotation of the steering shaft.

Electric all-wheel drive vehicles, e.g., vehicle 20, utilize independent propulsion devices, e.g., electric machines, at each axle enabling independent control of the torque at each axle. As such, the vehicle can dynamically adjust the front-rear torque split in order to maximize traction, handling performance, and the like. One benefit of electric AWD is that the electric machines can change the torque delivery more quickly and accurately than an internal-combustion engine. As a result, the electric machines can allow for precise control of each axle. The speed of the electric machine directly reflects the average speed of the wheels on each axle. Therefore, the average wheel speed of each axle can be controlled by actively controlling the electric-machine speed at each axle to propel the vehicle at a driver-demanded speed.

Traditionally, drivers using conventional vehicles for off-road driving control the wheel speeds by modulating the accelerator and brake pedals simultaneously, otherwise known as "two-foot driving." The purpose of two-foot driving is to more precisely control the net torque at the wheels in order to control the wheel speeds. The driver uses the friction brakes to trim the powertrain torque at the wheels in order to very precisely control the wheel speed when traversing challenging terrain such as rock crawling. Two-foot driving, however, is an advanced technique that a novice driver may find challenging.

Electric AWD presents an opportunity to provide great off-road performance without requiring use of the two-foot technique. The vehicle 20 includes one or more systems that allow the driver to precisely control the vehicle speed and the wheel speed with just one foot (accelerator pedal) while avoiding the need to use the brake pedal. The vehicle 20 includes a control system that utilizes closed-loop speed control at each axle in order to precisely control the wheel speed with the accelerator pedal 45 thus allowing for one-pedal driving. The control system can automatically adjust torque to maintain the driver's desired vehicle speed regardless of changing surface conditions. The control system automatically calculates the wheel speed corresponding to the driver-demanded vehicle speed and adjusts powertrain torque to maintain the wheel speed regardless of the terrain or grade to provide the driver-demanded vehicle speed.

The controller 40 includes programming that allows the driver to set and modulate a desired vehicle speed (and consequently a target wheel speed) with the accelerator pedal. The controller 40 uses closed-loop electric-machine speed control to track the target wheel speed by automatically adjusting powertrain torque. This allows the driver to more easily traverse challenging off-road terrain by holding and adjusting the accelerator pedal in order to obtain the desired wheel/vehicle speed for the terrain and grade. The controller does the rest and will propel the vehicle at the desired speed as long as traction and other constraints are meet. The controller 40 is also programmed to hold the vehicle stationary when the driver tips-out (releases) the pedal 44 regardless of the grade. The vehicle may be held stationary using the electric machines, the friction brakes, or combinations thereof.

The vehicle 20 includes a one-pedal driving mode that may be used during off-roading or other suitable time. The one-pedal driving mode may be selected by the driver through the human-machine interface (HMI) of the vehicle, such as a touchscreen, through buttons, or the like. The HMI may include one or more menu pages for the one-pedal driving mode. The menu pages have selectable fields including enable/disable one-pedal driving mode and others. The one-pedal mode includes maximum and minimum wheel speeds that are set either by the driver or by the vehicle. The minimum wheel speed may be zero. The maximum wheel speed may be a user-set field with an upper limit. For example, the menu may include a field that allows the driver to enter a maximum desired vehicle speed in miles per hour (MPH) or kilometers per hour (KPH). The maximum vehicle speed may be between 0 and 20 MPH, for example. One or more vehicle controllers, e.g., controller 40, may convert the vehicle speed to a corresponding wheel speed having units such as radians per second, revolutions per minutes, or the like. The wheel speed may be calculated by the following example equation: wheel speed=vehicle speed/tire rolling radius; where the vehicle speed is in m/s and the radius is in meters. In other embodiments, the field may request the user to enter a maximum wheel speed, however, this is not a familiar unit for most drivers.

Once the maximum and minimum vehicle/wheel speeds are set, the accelerator pedal 44 is mapped to vehicle/wheel speed so that a change in pedal position results in a change in driver-demanded vehicle speed and a change in the target wheel speed. That is, each of the pedal positions correspond to a desired vehicle/wheel speed. For example, 0% pedal depression corresponds to the minimum vehicle speed, e.g., zero mph and 100% depression corresponds to the maximum vehicle speed, e.g., 5 mph. Intermediate pedal positions correspond to vehicle/wheel speeds between the maximum and minimum values. The pedal positions may be linear (or not) with regards to vehicle/wheel speed, e.g., 50% depression of the accelerator pedal 44 corresponds to a vehicle speed of 50% of the maximum vehicle/wheel speed. Reducing the pedal position automatically results in vehicle slow down, e.g., regenerative or friction braking may be applied. This allows the driver to quickly and easily choose and maintain a particular vehicle/wheel speed by using only the accelerator pedal. While the driver is typically interested in the resulting vehicle speed, at the controller level, changes in pedal position correspond to changes in the target wheel speeds, which effectuate the driver-demanded vehicle speed.

Figure 2:
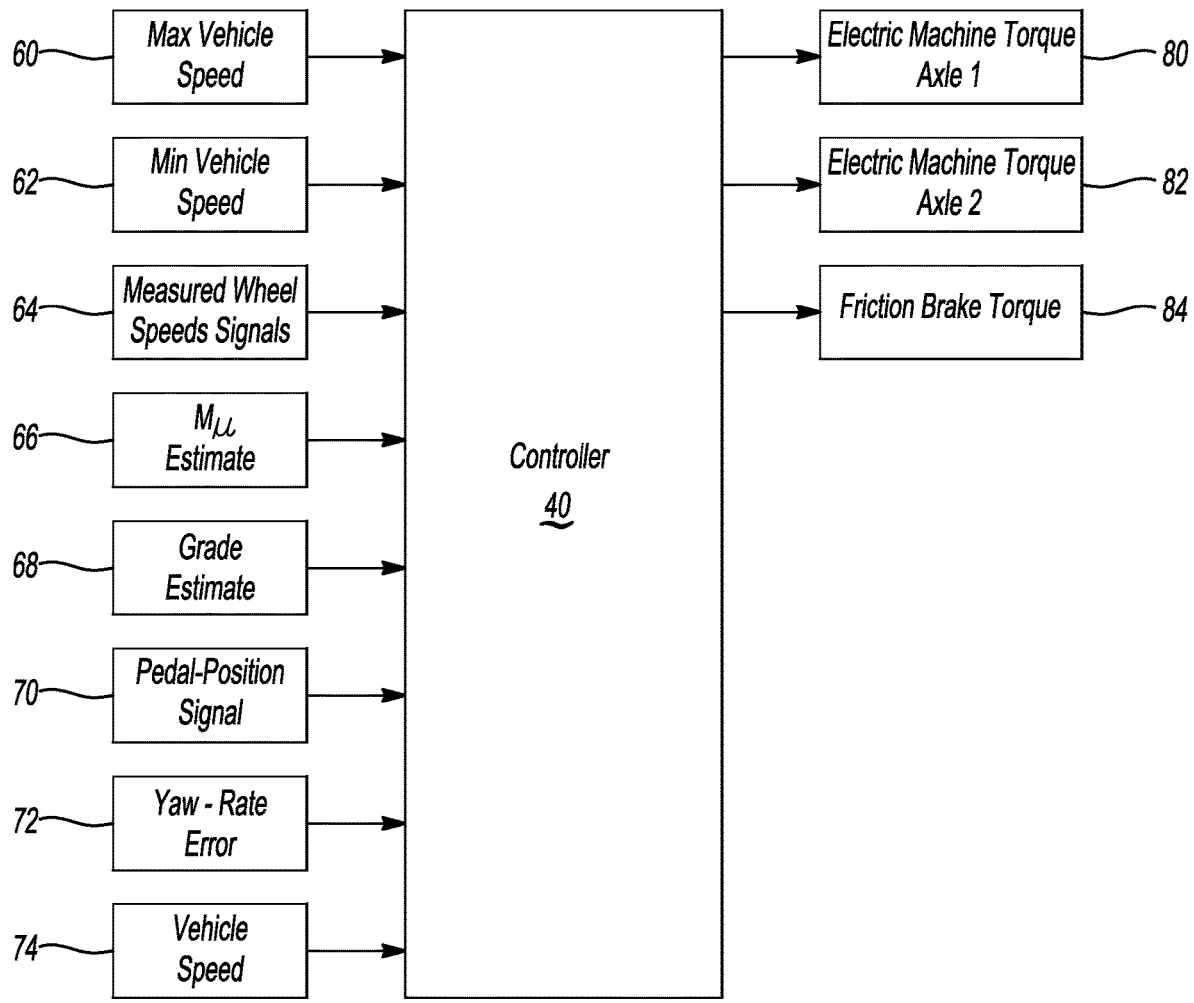
FIG. 2 is a control diagram for a one-pedal mode.

Referring to FIG. 2, the controller 40 is configured to receive a plurality inputs, perform a series of calculations based on the inputs, and output commands to the electric machines and/or the friction brakes. As discussed above, the controller 40 is programmed to receive a maximum vehicle speed 60 and a minimum vehicle speed 62 associated with the one-pedal mode. The maximum and minimum vehicle speeds 60, 62 may be user defined, or only the maximum speed 60 is user defined and the minimum speed is zero. The controller 40 is programmed to convert these vehicle speeds to corresponding wheel speeds. In other embodiments, the controller may receive maximum and minimum wheel speeds that were either entered as wheel speeds or previously converted.

The controller 40 is also programmed to receive the measured wheel-speed signals from the wheel-speed sensors 46. The controller 40 is further programmed to receive a Mu estimate 66 indicative a friction coefficient between the tires and the ground, and a grade estimate 68 that may be determined based on signals from the sensors 48. The controller 40 also receives the pedal-position signal 70 from the accelerator pedal 45, a yaw-rate error signal 72, and a vehicle-speed signal 74. Based on the signals, the controller 40 outputs a commanded torque 80 for the electric machine 26, a commanded torque 82 for the electric machine 34, and/or a friction brake torque 84. The motors 26, 34 include their own controllers that are configured to receive the commanded torques and determine the appropriate voltage, current, etc. for producing said torques. The brake module is configured to receive the friction brake torque 84 and command the appropriate fluid pressure to the friction brakes 42 to appropriately slow the vehicle.

The one-pedal driving mode controls may be broken up into a wheel-speed target calculation, a closed-loop speed control of the electric machine(s) and a brake-torque calculation. The wheel-speed target calculation uses the accelerator-pedal position and translates it into a desired wheel-speed target for each axle. The pedal position may be filtered and rate limited before use as an input to a base wheel speed target map. The filter and rate limits may be a function of pedal rate of change and vehicle speed. They can be tuned so that a fast pedal input at low vehicle speeds translates to light filtering and large rate limits in order to ensure a fast response to the driver's pedal inputs. The pedal position is used to determine a driver-demanded wheel speed (also known as a base wheel speed target) from mapping stored in memory. The map is calibratable and maps the accelerator pedal to a driver-demanded wheel speed. The maximum driver-demanded wheel speed can be determined by the driver via the human-machine interface as discussed above. The minimum driver-demanded wheel speed may be zero and is achieved when the pedal position is 0 percent. The maximum driver-demanded wheel speed is achieved when the pedal position is at 100 percent. The driver-demanded wheel speed is arbitrated between a maximum and minimum clip to produce a target wheel speed. The maximum and minimum clips are determined by the maximum allowable wheel slip map with yaw-rate correction and surface Mu modification. The maximum and minimum clips limit the wheel-speed target in order to ensure that the wheel slip never exceeds a calibratable threshold. The yaw-rate correction monitors yaw-rate error and adjusts the maximum slip limit in order to correct for oversteer or understeer. This is done by adjusting the maximum slip of the front and rear axle. During an oversteer event, more slip is allowed at the front axle and less slip is allowed at the rear axle. During an understeer event, more slip is allowed at the rear axle and less slip is allowed at the front axle. The Mu modifier map monitors the ground Mu estimate and can allow an increase in maximum slip if a deformable surface is detected. A pedal modifier map allows the driver to temporarily exceed the maximum slip limit in the event of a wide-open pedal position (100%) where the driver requires more slip.

The final wheel-speed target is used by a closed-loop motor speed controller to command the appropriate amount of torque to track the wheel-speed target. The controller gains can be scheduled as a function of the control error and instantaneous tire Mu estimate to obtain more robust performance on different surfaces. The closed-loop speed controller uses grade estimate and vehicle speed to calculate a feedforward torque in order to preemptively apply the appropriate amount to electric machine torque to hold the vehicle on a grade. The feedforward torque allows the feedback controller to have more precise control of the electric machine speed during transient events. Finally, the feedback controller monitors the crawl brake torque request in order to avoid stalling the motor when the vehicle is stationary for an extended period of time. When the vehicle is stationary for an extended period of time, the control system blends out motor torque and blends in friction brake torque to hold the vehicle still to prevent overloading the electric machine.

The brake-torque controls monitor the vehicle speed and pedal position to calculate a calibratable friction brake torque request. This brake torque is intended to dampen the vehicle motion at low speeds and prevents vehicle roll back. Additionally, if the battery state of charge (SOC) is high and prevents regenerative motor torque, the brake-torque controls will provide the negative torque requested by the closed-loop speed controller.

The resulting control system will translate the driver's accelerator pedal input to a wheel-speed target. The wheel-speed target is arbitrated for wheel slip and yaw rate before the closed-loop motor speed controller commands the appropriate amount of torque to track the wheel-speed target. The closed-loop controller will automatically adjust torque regardless of the terrain or grade in order to track the driver's wheel-speed target set by the accelerator-pedal position. This allows the driver to use the accelerator pedal alone to traverse challenging off-road terrain.

Figure 3:
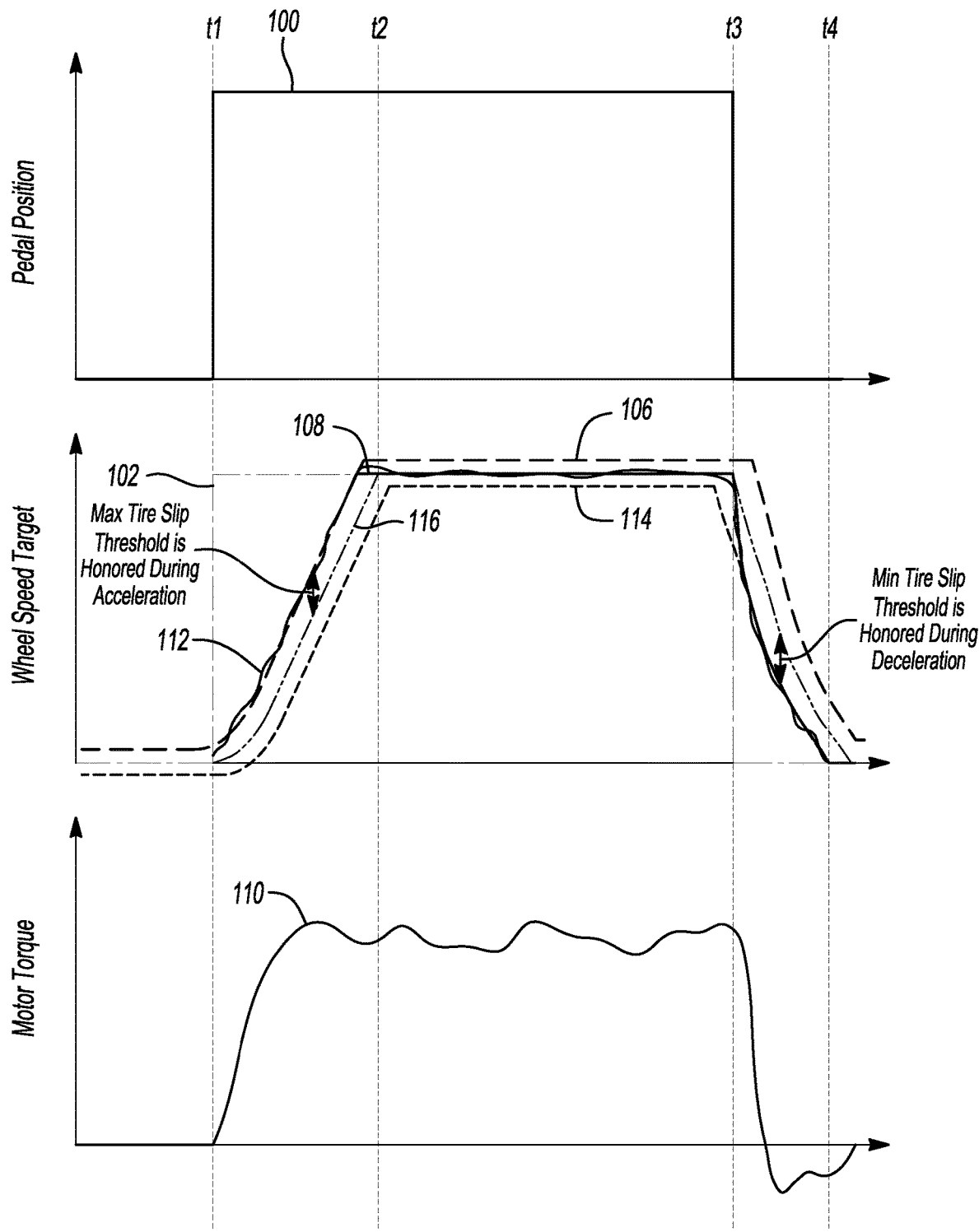
FIG. 3 are plots of various parameters measured during an example one-pedal driving scenario.

The following figures and related text describe example driving situations to illustrate the above-described concept. FIG. 3 illustrates an example operation of the vehicle 20 in the one-pedal mode. In this example, the vehicle is driving on a relatively flat grade. The driver depresses the accelerator pedal 45 at time $T_1$ increasing the pedal position 100. The controller 40 receives a signal indicative of the pedal position 100 resulting in an increase in the driver-demanded wheel speed 102 (this may also be referred to as a base or raw wheel-speed target).

The controller is programmed with a maximum wheel-speed clip 106 and a minimum wheel-speed clip 114 that are based on vehicle speed, a Mu modifier, yaw-rate error, and pedal position. The clips 106 and 114 reduce wheel slip to a threshold amount. The maximum wheel-speed clip 106 is used when the vehicle is accelerating and the minimum wheel-speed clip 114 is used when the vehicle is slowing down. The clips 106 and 114 may be a speed offset, that is the maximum wheel-speed clip 106 may be equal to the vehicle speed plus an offset and the minimum wheel-speed clip 114 may be equal the vehicle speed minus an offset.

Between times $T_1$ and $T_2$, the vehicle is accelerating from rest and the maximum wheel speed clip 106 limits the wheel-speed target 108 below the driver-demanded wheel speed 102 in order to ensure that the wheels do not slip beyond the threshold. The closed-loop controller applies the appropriate amount of electric-machine torque 110 to track the wheel-speed target 108. Just prior to time $T_2$, the measured wheel speed 112 catches the final wheel-speed target 108 and the controller 40 reduces the torque 110 to track the final wheel-speed target 108.

At time $T_2$, the vehicle speed 116 (measured in the wheel domain) converges with the driver-demanded wheel-speed target 102 and thus the vehicle speed 116 now substantially matches the driver-demanded vehicle speed, e.g., 5 MPH.

Between times $T_2$ and $T_3$, the driver is holding the pedal position 100 constant and thus the vehicle 20 delivers a sustainably constant vehicle speed 116 that corresponds the pedal position 100.

At time $T_3$, the driver fully tips-out of the pedal 45 decreasing the pedal position 100 to 0 percent. This changes the driver-demanded wheel speed 102 to zero. The controller 40 now brakes the vehicle 20 to come to a stop. The controller cannot instantly command zero speed without locking up the wheels, and instead, the target wheel speed 108 is set to the minimum wheel-speed clip 114. The vehicle may be braked by friction braking, regenerative braking, or combinations thereof. Once the wheel speeds reach zero, the controller automatically adjusts torque to hold the vehicle stationary. The controller can adjust torque to hold zero wheel speed regardless of grade.

Figure 4:
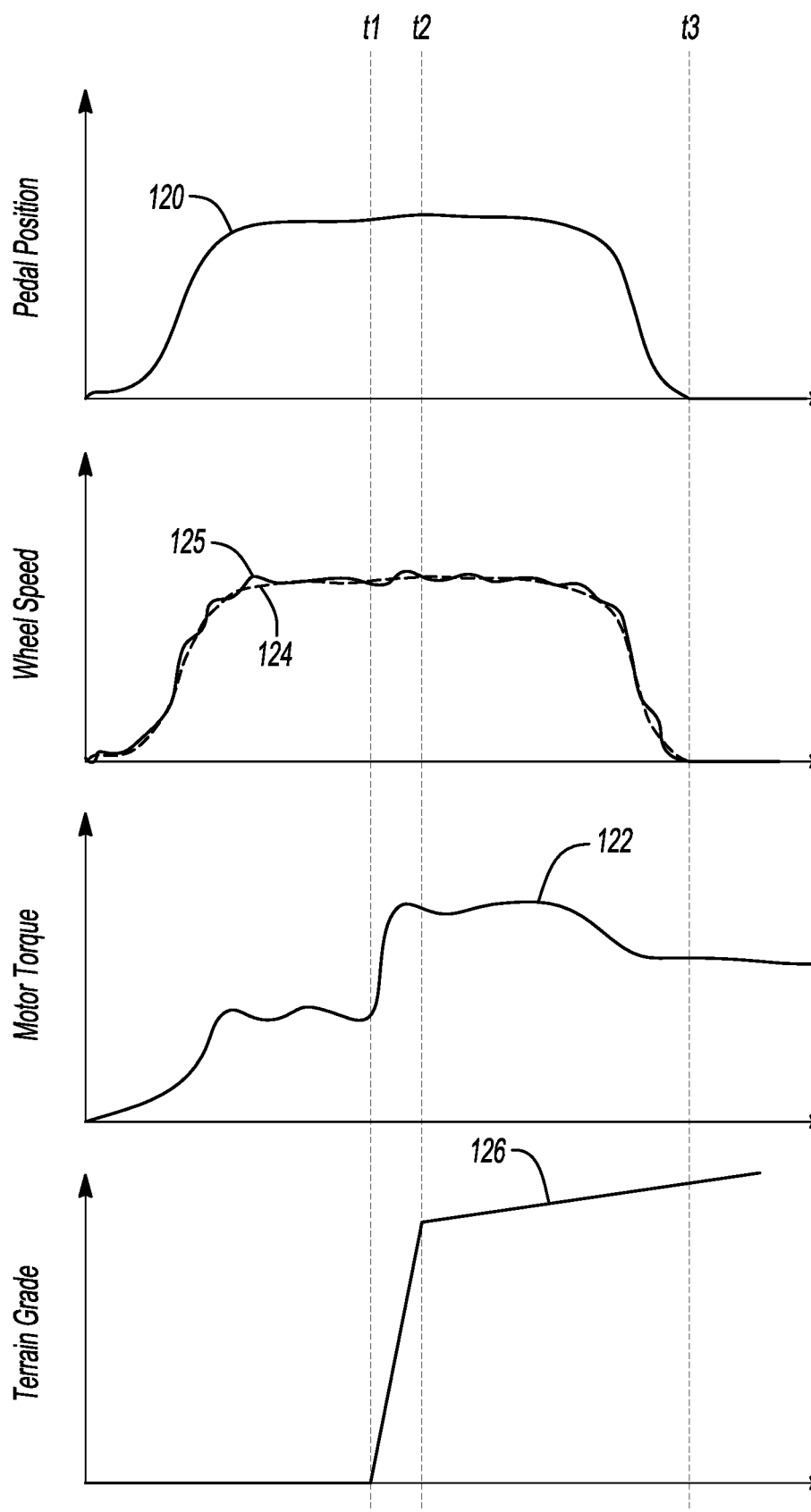
FIG. 4 are plots of various parameters measured during another example one-pedal driving scenario.

FIG. 4 illustrates another example operation of the vehicle 20 in the one-pedal mode. In this example, the vehicle is driving uphill. The driver tips into the pedal and holds a generally constant pedal position 120. The control system determines a wheel-speed target 124 based on the pedal position 120, and the closed-loop speed controller applies the appropriate amount of torque 122 to track the target speed 124. From the beginning of the data trace up to time $T_1$, the terrain grade 126 is flat. From time $T_1$ to $T_2$, the terrain grade increases. During the increase in grade, the control system automatically increases the torque 122 in order to maintain the desired wheel speed as shown by measured wheel speed trace 125. After time $T_2$, the terrain continues uphill at a relatively constant grade 126. At time $T_3$, the driver tips out of the pedal and the control system brings the wheels speeds to zero and holds the zero wheel speed while on the uphill grade.

Figure 5:
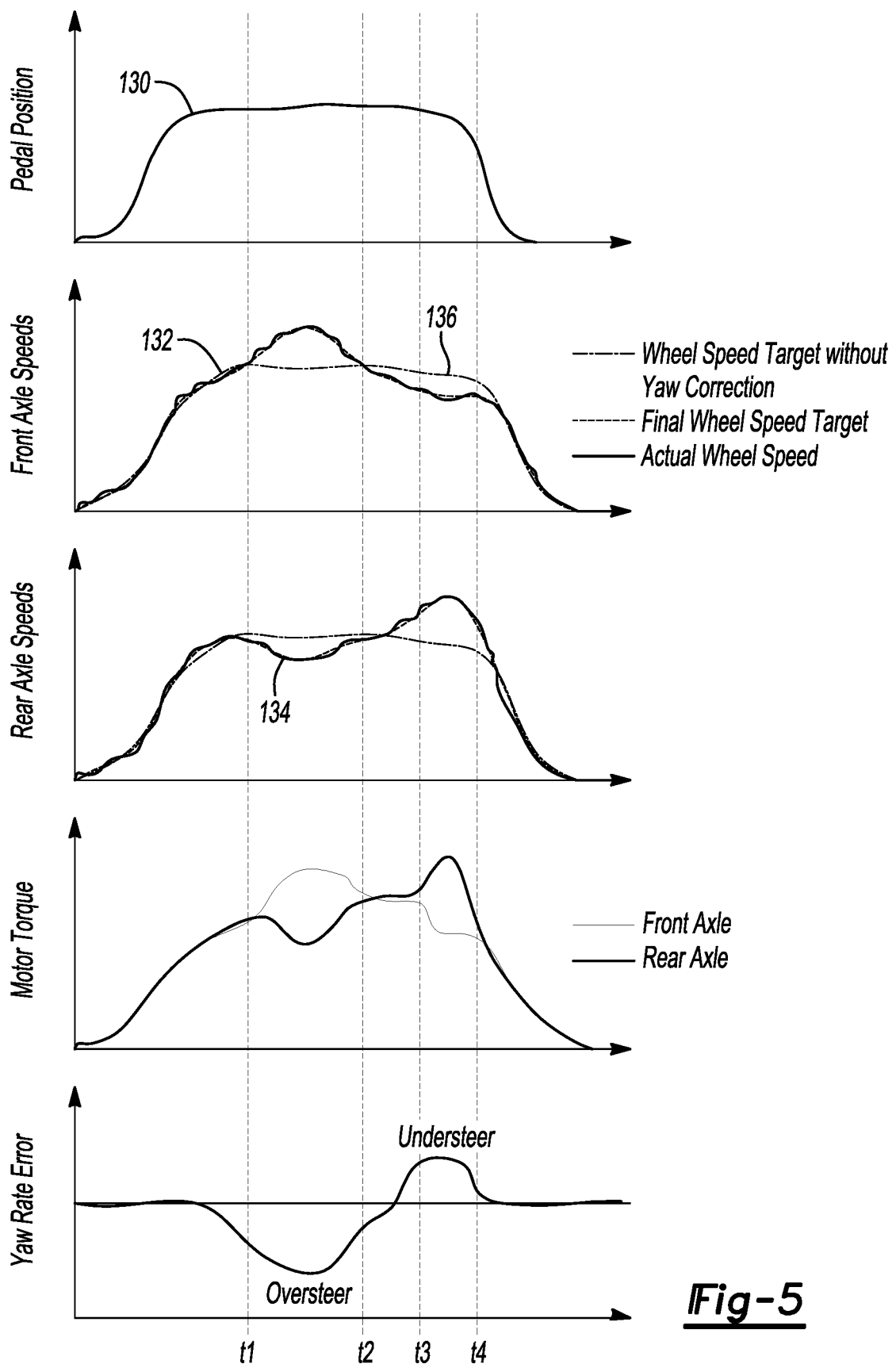
FIG. 5 are plots of various parameters measured during yet another example one-pedal driving scenario.

FIG. 5 shows an example operation of the vehicle 20 in the one-pedal mode in which the controller corrects for oversteer and understeer. The driver tips into the pedal and maintains a constant pedal position 130. At time $T_1$, the vehicle 20 begins to experience negative yaw-rate error corresponding to oversteer. To correct the oversteer event, the control system increases the wheel-speed target 132 of the front axle and decreases the speed target 134 of the rear axle. (Note that the wheel speed target without yaw rate correction 136 follows the same shape as the pedal position 130.) The oversteer event is controlled between time $T_2$ and $T_3$ and the wheel-speed targets 132, 134 begin to converge to the wheel-speed target without yaw correction 136. At time $T_3$, the vehicle begins to experience positive yaw-rate error corresponding to understeer. To correct the understeer event, the control system decreases the wheel speed target 132 at the front axle and increases the wheel speed target 134 at the rear axle. After time $T_4$, the understeer event is controlled and the wheel-speed targets 132, 134 converge to the original wheel-speed target without yaw-rate correction 136.

FIG. 6 illustrates a control diagram 200 for one-pedal drive mode. This figure provides representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 40. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 6A:
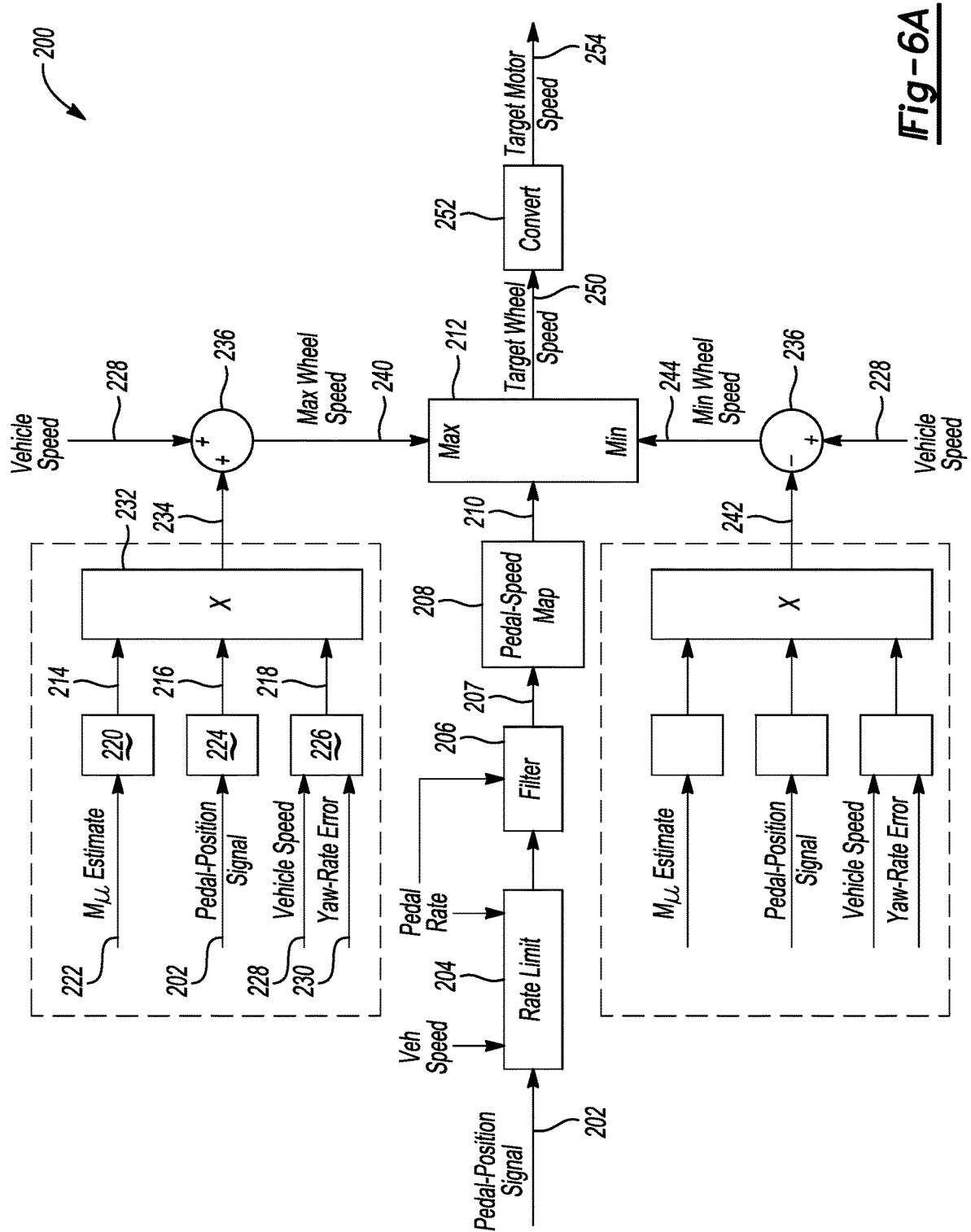
FIG. 6A is a first portion of a control diagram for the one-pedal mode.

Referring to FIG. 6A, the driver controls the speed of the vehicle using the accelerator 45 during the one-pedal drive mode. The accelerator pedal 45 outputs a raw pedal-position signal 202 that is received at a rate limit box 204. The vehicle speed and the pedal rate (rate of change of the pedal position) are also fed into the rate limit box 204. The rate limit box 204 in conjunction with the filter 206 cooperate to prevent excessively large step changes in the final pedal-position signal 207.

The final pedal-position signal 207 is fed into the pedal-speed map 208. The map 208 correlates accelerator pedal position with a desired vehicle/wheel speed. As discussed above, each of the pedal positions corresponds to a driver-demanded speed of the vehicle/wheels. Mapping logic 208 may be one or more lookup tables or the like. The mapping 208 outputs a driver-demanded wheel speed 210 based on the pedal-position signal 207. The driver-demanded wheel speed 210 is the wheel speed that the driver is requesting but is not necessarily the wheel speed the vehicle can delivered due to limitations such as traction and the like. To account for these other variables, the driver-demanded wheel speed 210 may be constrained between minimum and maximum speeds that account for traction and the like at box 212.

The maximum wheel speed is based on a traction modifier 214, a pedal modifier 216, and a yaw-control modifier 218. The traction modifier 214 output by box 220 and is based on a Mu estimate 222. Pedal modifier 216 is based on the pedal position signal 202. The box 224 can temporarily increase the maximum slip target if the drivers fully tips into the pedal and holds it thus requesting more wheel slip. The slip modifier 218 is calculated by box hundred and 26 and is based on the vehicle speed 228 and the yaw-rate error 230. The modifiers 214, 216, 218 are fed into box 232 that outputs a speed offset 234 in the wheel speed domain. The speed offset 234 is added to the vehicle speed 228, which has been converted into the wheel domain, at summation block 236 to calculate the maximum wheel speed 240.

The minimum wheel speed is calculated similarly to the maximum wheel speed and for brevity will not be described again. The minimum wheel speed calculations outputs a speed offset 242 that is subtracted from the vehicle speed to determine the minimum wheel speed 244.

Box 212 operates to limit the driver-demanded wheel speed 212 to be within the minimum and maximum speeds 240, 244. The driver-demanded speed, if within these limits, passes through and becomes the target wheel speed 250. If not, box 212 outputs the maximum speed 240 if the driver is requesting propulsion or the minimum wheel speed 244 if the driver is requesting braking. Control box 252 converts the target wheel speed 250 to a target electric-machine speed 254 that corresponds to the target wheel speed 250. Generally, the target electric-machine speed is equal to the wheel speed times a gear ratio.

Figure 6B:
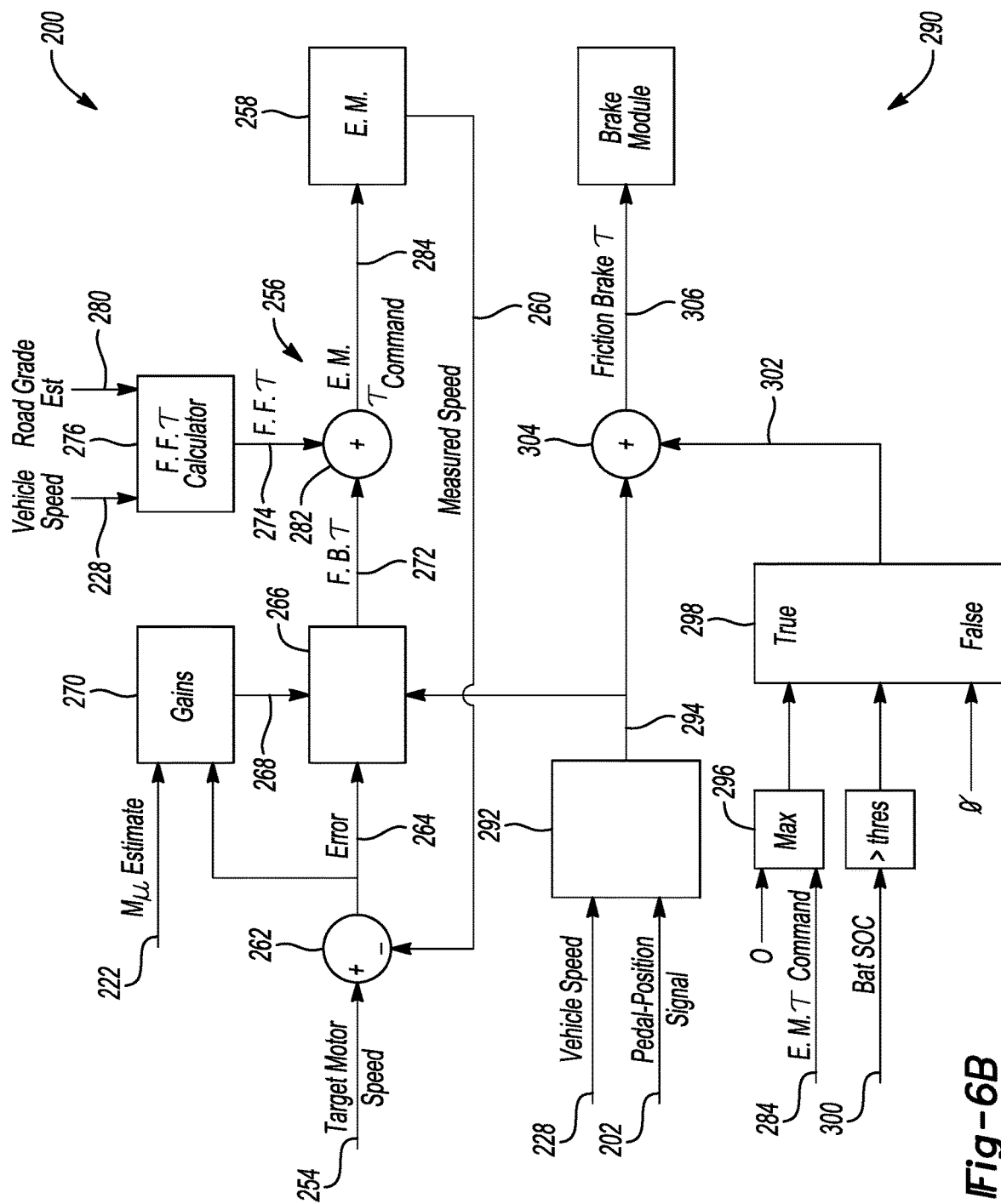
FIG. 6B is the second portion of the control diagram for the one-pedal mode.

Referring to FIG. 6B, the target electric-machine speed 254 feed into a closed-loop feedback controls 256. The controls 256 may be performed by a proportion-integral (PI) controller, a proportion-integral-derivative (PID) controller, or the like. The controls 256 put the electric machine 258 into speed control and command torques to the electric machine 258 to track the target 254. The controls 256 also include a feedforward component 274 to account for road grade and the like. The electric machine 258 includes sensors or other components to output a measured speed of the electric machine 258. The target speed 254 and the measured speed 260 are compared at difference block 262 to determine a speed error 264 between the target speed 254 and the measured speed 260. The error 264 is fed into block 266 along with gains 268. The gains 268 are output by control box 270 and are adjusted based on the Mu estimate 222. A feedback torque 272 for the electric machine 258 is output from block 266.

The feed-forward torque 274 is calculated by a feedforward calculator 276. The control box 276 receives the vehicle speed 228 and a road-grade estimate 280. The calculator 276 includes look-up tables or the like that provide an appropriate feedforward torque 274 for a given vehicle speed and a given road grade. Feedforward torque 274 is added to the feedback torque 272 at summation block 282. The resulting sum is the final torque command 284 for the electric machine 258.

Controls 200 also include brake-torque controller 290 used to determine if friction braking is needed to supplement the regenerative braking of the electric machine 258 to slow the vehicle to the driver-demanded speed. The vehicle speed 228 and the pedal-position signal 202 are fed into control box 292 that calculates the friction-brake torque 294 that is required to dampen the vehicle motion at low speeds. Control box 296 receives the electric machine torque command 284 and outputs the greater of zero or the torque 284. Control box 298 determines if the battery state of charge 300 is greater than a threshold, and if so, outputs the maximum of control box 296. If the battery state of charge is less than the threshold, control box 298 outputs a value of zero. The brake torque 294 is added to the output 302 at summation block 304 to determine a friction-brake torque 306. The friction-brake torque 306 is used to control the brake module.

The controls 200 may be performed for all electric machines of the vehicle. In the illustrated example, the controls 200 are used to separately determine the torque commands for both electric machines 26 and 34. This allows the different axles to output different torques.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle with one-pedal driving mode, the vehicle comprising:
    a first axle including a first electric machine configured to power first wheels;
    a second axle including a second electric machine configured to power second wheels;
    an accelerator pedal; and
    a controller programmed to, in response to a request for one-pedal driving mode:
        map pedal positions of the accelerator pedal to speeds of the first and second wheels such that each of the pedal positions corresponds to a driver-demanded speed of the first and second wheels, and
        in response to the driver depressing the accelerator pedal to a first of the pedal positions, (i) set a driver-demanded wheel speed to a value associated with the first pedal position, (ii) set a target wheel speed of the first wheels based on the driver-demanded wheel speed, (iii) set a target electric machine speed for the first electric machine based on the target wheel speed, and (iv) command a positive torque to the first electric machine based on an error between the target electric machine speed and a measured speed of the first electric machine so that the first wheels rotate according to the target wheel speed.

2. The vehicle of claim 1, wherein the controller is further programmed to, in response to the driver fully releasing the accelerator pedal to a second of the pedal positions, (i) set the driver-demanded wheel speed to zero, (ii) set another target wheel speed of the first wheels based on the driver-demanded wheel speed, (iii) set another target electric machine speed for the first electric machine based on the another target wheel speed, and (iv) command a negative torque to the first electric machine based on an error between the another target electric machine speed and another measured speed of the first electric machine so that the first wheels rotate according to the another target wheel speed.

3. The vehicle of claim 2, wherein the negative torque is further based on a state of charge of a traction battery associated with the first electric machine.

4. The vehicle of claim 1, wherein the controller is further programmed to, in response to the driver depressing the accelerator pedal to the first of the pedal positions, (v) set another target wheel speed of the second wheels based on the driver-demanded wheel speed, (vi) set another target electric machine speed for the second electric machine based on the another target wheel speed, and (vii) command another positive torque to the second electric machine based on an error between the another target electric machine speed and a measured speed of the second electric machine so that the second wheels rotate according to the another target wheel speed.

5. The vehicle of claim 4, wherein the controller is further programmed to, in response to the driver fully releasing the accelerator pedal to a second of the pedal positions, (i) set the driver-demanded wheel speed to zero, (ii) set yet another target wheel speed of the first wheels based on the driver-demanded wheel speed, (iii) set yet another target electric machine speed for the first electric machine based on the yet another target wheel speed, and (iv) command a negative torque to the first electric machine based on an error between the yet another target electric machine speed and yet another measured speed of the first electric machine so that the first wheels rotate according to the yet another target wheel speed.

6. The vehicle of claim 1, wherein the positive torque includes a feedback component based on the error and a feedforward component based a grade estimate of a driving surface.

7. The vehicle of claim 1, wherein the target wheel speed is based on a mu estimate.

8. The vehicle of claim 7, wherein the target wheel speed is further based on a yaw-rate error.

9. A method of operating a four-wheel drive electric vehicle in a one-pedal driving mode, the method comprising:
  in response to the vehicle being in the one-pedal driving mode and an accelerator pedal being depressed to a first pedal position, commanding a positive torque to an electric machine based on an error between target and measured speeds of the electric machine so that wheels driven by the electric machine rotate according to a target wheel speed based on the first pedal position; and
  in response to the vehicle being in the one-pedal driving mode and an accelerator pedal being fully released to a second pedal position, commanding a negative torque to the electric machine based on an error between another target and measured speeds of the electric machine so that the wheels driven by the electric machine rotate according to another target wheel speed based on the second pedal position.

10. The method of claim 9 further comprising:
  mapping pedal positions of the accelerator pedal to speeds of the wheels such that each of the pedal positions corresponds to a driver-demanded speed of the wheels, wherein the target wheel speed and the another target wheel speed are based on the driver-demanded speed.

11. The method of claim 10, wherein the driver-demanded speed is a maximum wheel speed when the accelerator pedal is fully depressed, and the driver-demanded speed is zero when the accelerator pedal is fully released.

12. The method of claim 9, wherein the target electric machine speed is based on the target wheel speed, and the target wheel speed is equal to the lesser of (i) a driver-demanded wheel speed associated with the first pedal position and (ii) a measured speed of the vehicle plus an offset.

13. The method of claim 9, wherein the positive torque is further based on a grade estimate of a driving surface.

14. The method of claim 9, wherein the negative torque is further based on a state of charge of a traction battery associated with the electric machine.

15. A vehicle with one-pedal driving mode, the vehicle comprising:
  a first axle including a first electric machine configured to power first wheels;
  a second axle including a second electric machine configured to power second wheels;
  an accelerator pedal; and
  a controller programmed to, in response to a request for one-pedal driving mode:
    receive minimum and maximum speeds for the first and second wheels during the one-pedal driving mode,
    map pedal positions of the accelerator pedal to speeds of the first and second wheels such that each of the pedal positions corresponds to a driver-demanded speed of the first and second wheels, wherein the driver-demanded speed is the maximum wheel speed when the accelerator pedal is fully depressed, and the driver-demanded speed is the minimum wheel speed when the accelerator pedal is fully released, and
    in response to the driver depressing the accelerator pedal to a first of the pedal positions, (i) set the driver-demanded wheel speed to a value associated with the first pedal position, (ii) set a target wheel speed of the first wheels based on the driver-demanded wheel speed, (iii) set a target electric machine speed for the first electric machine based on the target wheel speed, and (iv) perform closed-loop feedback control of the first electric machine in which the first electric machine tracks the target electric machine speed so that the first wheels are rotated substantially at the target wheel speed.

16. The vehicle of claim 15, wherein the controller is further programmed to, in response to the driver depressing the accelerator pedal to the first of the pedal positions, (v) set a target wheel speed of the second wheels based on the driver-demanded wheel speed, (vi) set a target electric machine speed for the second electric machine based on the target wheel speed of the second wheels, and (vii) perform closed-loop feedback control of the second electric machine in which the second electric machine tracks the target electric machine speed of the second electric machine so that the second wheels are rotated substantially at the target wheel speed of the second wheels.

17. The vehicle of claim 15, wherein the target wheel speed is further based on a mu estimate, a yaw-rate error, and a speed of the vehicle.

18. The vehicle of claim 15, wherein the perform closed-loop feedback control of the first electric machine includes commanding a torque to the electric machine.

19. The vehicle of claim 18, wherein the torque includes a feedback component based on an error between a measured speed of the first electric machine and the target electric machine speed and a feedforward component based a grade estimate of a driving surface.

20. The vehicle of claim 15, wherein the controller is further programmed to in response to the driver fully releasing the accelerator pedal, (v) set the driver-demanded wheel speed to the minimum speed, (vi) set another target wheel speed of the first wheels based on the driver-demanded wheel speed, (vii) set another target electric machine speed for the first electric machine based on the another target wheel speed, and (iv) perform closed-loop feedback control of the first electric machine in which the first electric machine tracks the another target electric machine speed so that the first wheels are rotated substantially at the another target wheel speed.

* * * * *